(12) United States Patent  
Blyden

(10) Patent No.: US 8,966,818 B2  
(45) Date of Patent: Mar. 3, 2015

(54) VERTICAL GARDENING ASSEMBLY AND KIT AND METHOD OF MAKING AND USING THE SAME

(76) Inventor: Eluemuno Richard Blyden, New York, NY (US)

( * ) Notice: Subject to any disclaimer, the term of this patent is extended or adjusted under 35 U.S.C. 154(b) by 109 days.

(21) Appl. No.: 13/825,757

(22) PCT Filed: Sep. 22, 2011

(86) PCT No.: PCT/US2011/052758  
§ 371 (c)(1),  
(2), (4) Date: Apr. 10, 2013

(87) PCT Pub. No.: WO2012/040462  
PCT Pub. Date: Mar. 29, 2012

(65) Prior Publication Data  
US 2013/0212940 A1    Aug. 22, 2013

Related U.S. Application Data

(60) Provisional application No. 61/385,175, filed on Sep. 22, 2010.

(51) Int. Cl.  
*A01G 25/00* (2006.01)  
*A01G 9/02* (2006.01)

(52) U.S. Cl.  
CPC ..................................... *A01G 9/022* (2013.01)  
USPC .................................................. 47/82; 47/83

(58) Field of Classification Search  
USPC .............................................. 47/65.8, 82, 83  
See application file for complete search history.

(56) References Cited

U.S. PATENT DOCUMENTS

| | | | |
|---|---|---|---|
| 1,752,597 | A | 1/1930 | Jackson |
| 4,065,876 | A | 1/1978 | Moffett |
| 5,067,275 | A | 11/1991 | Constance |
| 5,136,807 | A | 8/1992 | Orlov |
| 5,555,676 | A | 9/1996 | Lund |
| 6,079,154 | A | 6/2000 | Farwell |
| 6,450,362 | B1 | 9/2002 | Laurion |
| 6,840,008 | B1 | 1/2005 | Bullock |
| 6,921,661 | B2 | 7/2005 | Nagy |
| 7,516,574 | B2 | 4/2009 | Gottlieb |

*Primary Examiner* — Kristen C Hayes  
(74) *Attorney, Agent, or Firm* — LuAnn Csevr; Chace Ruttenberg & Freedman LLP

(57) ABSTRACT

Provided is a cylindrical container for plant growth substrates in which plants of diverse species may be grown all over its external surfaces, and for water, air and nutrients to be supplied to their roots through systems of pipes or cavities internal to the cylinder and embedded in the substrate.

17 Claims, 6 Drawing Sheets

VERTICAL GARDENING ASSEMBLY AND KIT AND METHOD OF MAKING AND USING THE SAME

CROSS-REFERENCE TO RELATED APPLICATIONS

This application is a 371 application of international application number PCT/US11/52758 which was filed Sep. 22, 2011, and which claims the benefit of provisional application Ser. No. 61/385,175 filed Sep. 22, 2010.

FIELD OF THE INVENTION

The invention is in the technical field of containers and container systems for growing plants. More particularly, the invention, is in the held of containers and container systems for growing plants on a vertically oriented substrate. The invention is also concerned with types of planters that may be filled with any of a plurality of natural and artificial substrates able to support the growth of roots, suckers and tubers of plants that are seeded or transplanted within the substrate so that their stems and shoots may grow either horizontally or vertically out of the periphery of the container. The invention is also concerned with types of planters that permit use of a plurality of systems for efficient delivery of water, air, carbon dioxide, nutrients and thermal energy to support the growth of roots, suckers and tubers of plants so that their stems and shoots may grow either horizontally or vertically out of the periphery of the container.

BACKGROUND AND OBJECTS OF THE INVENTION

In nature, there are plant species that have specifically adapted to growing on vertically oriented substrates such as cylindrical tree trunks, cliffs and steep mountainsides. Human cultures have exploited the properties of climbing plants and hanging plants by all manner of devices (see for example U.S. Pat. No. 4,825,592) e.g. topiaries specially designed for orchid species. However, it is commonly observed in nature that many, if not all plant species, can tolerate vertical orientation of their growing substrate to greater or lesser degree. Individual plants adapt their vegetative growth accordingly so that their roots grow towards nutrients and water in the substrate and their leaves and stems grow towards sunlight and air. This property of plants has formed the basis of several prior art patents directed towards growing plants on a vertically oriented substrate, or even upside down, mostly for purposes of ornamentation. See for example U.S. Pat. No. 7,171,782. Examples of vertical planters and containers for growing plants on a vertically oriented substrates are generally well known in the art. During the Depression, U.S. Pat. No. 1,752,597, which issued in 1930 in the name of Jackson, described a vegetative device on which many plants could be grown anywhere on its exposed periphery that was mounted on a freely rotating base to allow plants on ail sides to be oriented towards sunlight. Similarly, U.S. Pat. No. 4,065,876, issued in 1978 in the name of Moffett, Jr., describes a stackable, portable garden in which plants are introduced through small holes cut in the side of a plastic bag containing soil and supported by a wire mesh frame. Another example in the art is a vertically stackable container with tapered walls having an exposed top surface in which plants may be planted as described in U.S. Pat. Nos. 5,136,807 and 6,840,008 in the names of Orlov and Bullock, respectively. In many of these devices, the chief shortcoming is often related to ease of use and the lack of an effective internal watering system. U.S. Pat. No. 7,516,574 in the name of Gottlieb discloses a vertical garden composed of a stack of modular planters nested above a reservoir, with a vertically extending tube passing through openings in the planters and an externally mounted pump for distributing air and water to the planters.

One object of the present invention is to provide an economically viable solution to food shortages in low and middle income countries and resource poor areas of high income countries by permitting plants to be grown in small spaces or where there is no access to tillable soil.

Another object of the invention is to provide a convenient, simple, and affordable means of personal food production in rich and poor countries alike. Many city dwellers avidly pursue production of plants in pots and window boxes, but the potential for producing real economic and nutritional benefit for themselves and their communities through gardening is still limited by available plantable area and sunlight.

Yet another object of the invention is to provide a device for creative urban agriculture on small private or public patches of land for production of edible produce or ornamentals close to urban populations.

Yet another object of the invention is to increase the amount of plantable area that can be utilized for growing plants on a given footprint of available land, rooftop or balcony.

Yet another object of the invention is to provide improved methods of growing plants in a vertical format that can be readily used on balconies, patios, rooftops, courtyards, vehicles, boats, mobile homes either indoors or outdoors and in natural or artificial light.

A further object of the invention is to provide a plurality of embodiments of the planter in this disclosure that address particular circumstances, methods or needs of plant production by individuals, communities, municipalities or commercial organizations.

SUMMARY OF THE INVENTION

These objects are fulfilled by the assembly, kit, and methods of the invention. The vertical gardening assemblies and kits of the invention can be furnished at a cost that makes them economical for even the poorest urban populations: by use of inexpensive construction materials, and by making them of such a size as to allow production of a quantity of plants within one year, that have an economic value at least equal to the initial cost of the purchase and installation of the assembly. They are simple to use and simple to assemble. The invention enables people who are incapacitated by age or disability or who are unable to kneel to have the benefits and pleasure of growing plants. The invention may be employed in refugee camps to empower displaced families to grow their own edible plants so as to supplement their food supply. It may also be used in educational settings to improve the knowledge and understanding of nutrition among students and give them the opportunity to create and manage a garden, and in schools and museums to demonstrate plant growth phenomena. The garden assemblies of the invention can also be employed on a mass scale as part of a commercial, community or municipal enterprise.

In broad outline, the invention is a cylindrical container for plant growth substrates in which plants of diverse species may be grown all over its external surfaces, and for water, air and nutrients to be supplied to their roots through systems of pipes or cavities internal to the cylinder and embedded in the substrate. The growth substrates can include sand, soil, moss, rock or mixtures thereof, whether fertilized or not. In sum, anything which will support the growth of plant roots may be employed. The cylindrical form of the assembly offers many economic, ergonomic, and ecologic advantages not currently addressed by vertical garden planters, containers, or systems previously described in the literature. More specifically, the invention is a vertical gardening container assembly and kit composed of the following elements:

(a) a cylindrical mesh cage having circular upper and lower rims and open ends forming an open top and bottom when placed in an upright position;

(b) an air and water permeable bag positioned within the cage with closed end of the bag forming a bottom for the cage and the open end of the bag being supported by the upper rim of the cage, the bag being capable of retaining a plant growth substrate placed within it;

(c) a bottom, sub-assembly including a circularly-shaped tray having a diameter no greater than the diameter of the cage and a circumferentially-disposed wall with at least one overflow pipe extending therethrough, the tray and overflow pipe being impermeable to the plant growth substrate and to water and positioned at the bottom of the bag so as to be superposed thereon with the wall of the tray extending upwards; and (d) a watering sub-assembly positioned within the bag at a height no more than half the height of the cage, the watering sub-assembly composed of a loop of soaker hose positioned in the horizontal plane around the interior of the bag and a hollow, vertically extending, intake pipe connected near or at one end by connector means to the loop of soaker hose, the pipe having a height up to or above the top rim of the cage. A divider sheet is positioned atop the watering subassembly loop of soaker hose. The divider sheet is formed of flexible, water-impermeable material, it has a hole in it such that the intake pipe extends vertically through the hole snuggly to form a water retaining barrier atop the first watering sub-assembly.

If a taller assembly is desired, the watering sub-assembly is positioned within the bag at a height no great than one-third the height of the cage and a divider sheet is positioned atop the watering subassembly. The divider sheet is formed of flexible, water-impermeable material. It has a hole in it such that the intake pipe extends vertically through the hole snuggly to form a water retaining barrier atop the first watering sub-assembly. A second, identical, watering sub-assembly positioned within the bag at a minimum height at least one half the height of the cage and a maximum height no more than two-thirds the height of the cage is additionally included. The cylindrical mesh cage is preferably composed of metal, the bag is preferably composed of burlap and the bottom sub-assembly, water sub-assembly and divider sheet are preferably composed of an appropriate type of plastic.

To construct the assembly of the invention, the wire mesh is removed from the kit, rolled to form a cylindrical cage and secured in that position. The kit may include clips or other securing means for this purpose. Next, the cylindrical cage is placed vertically and the bag is secured inside the cage so that the bag bottom forms a bottom for the assembly. The bag can be secured by folding the extra at the top over the top rim of the cage, or by Velcro®, ties or other securing means. The elements of the bottom sub-assembly are removed from the kit and the overflow pipe is inserted into the hole in the wall of the tray. The sub-assembly is then placed in the bottom of the bag so that the tray wall extends upward. Plant growth substrate (not included in the kit) is then added to the bag to a height no greater than one-half the height of the cage. Next, the elements of the watering sub-assembly are removed from the kit and assembled and the watering sub-assembly is placed in the bag so that the loop of soaker hose sits atop the plant growth substrate and the intake pipe extends vertically to or above the upper rim of the cage and additional substrate is added to fill the bag. Additional watering sub-assemblies and substrate layers of not more than 12 inches thickness may be employed, as is described in the detailed description. When employed, the height of the watering sub-assemblies decreases accordingly.

Additional embodiments of the invention are described in the detailed description.

DETAILED DESCRIPTION OF THE INVENTION

Figure 1:
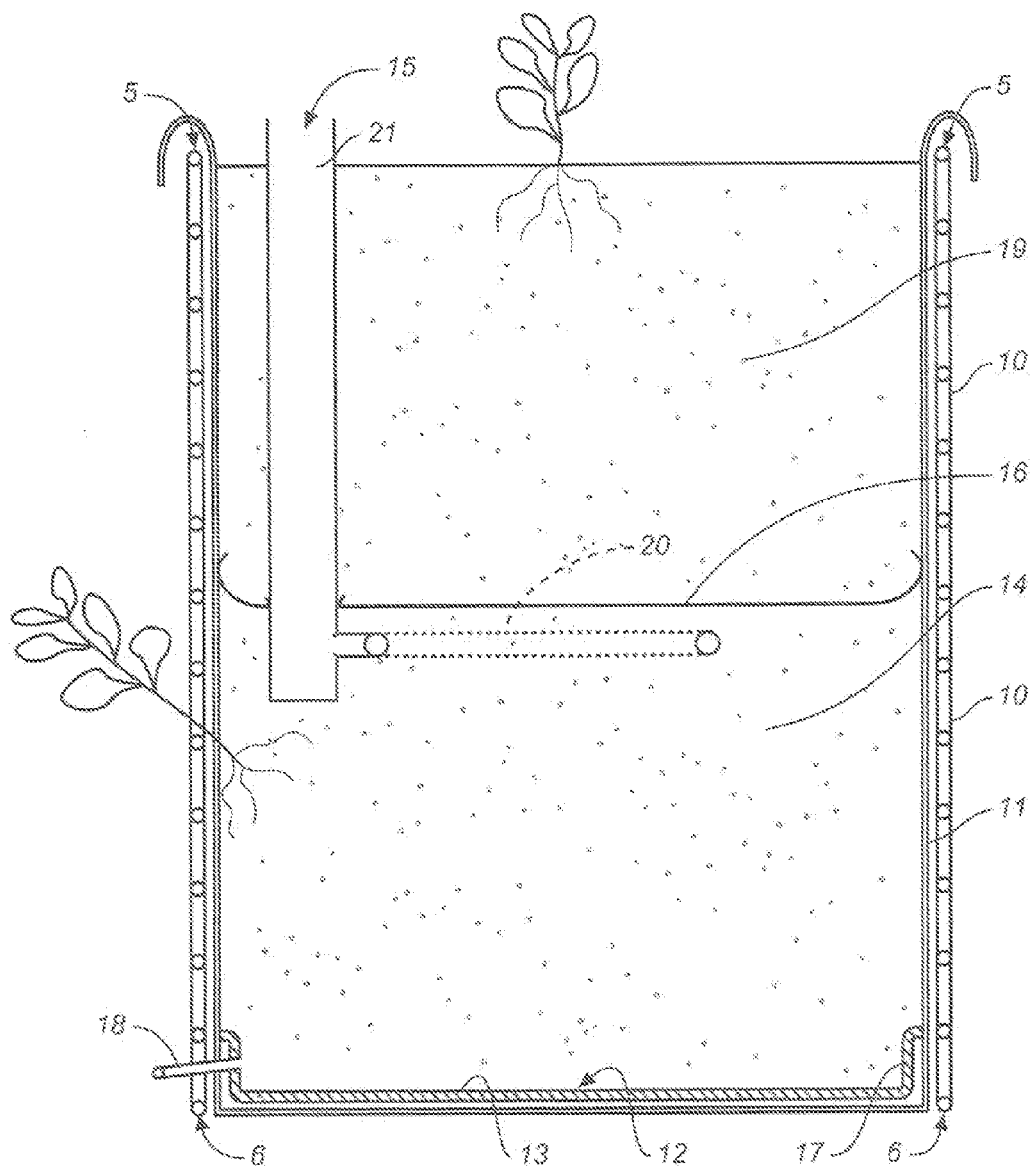
FIG. 1 is a cross sectional side view of a vertical gardening container of the present invention.
Figure 2:
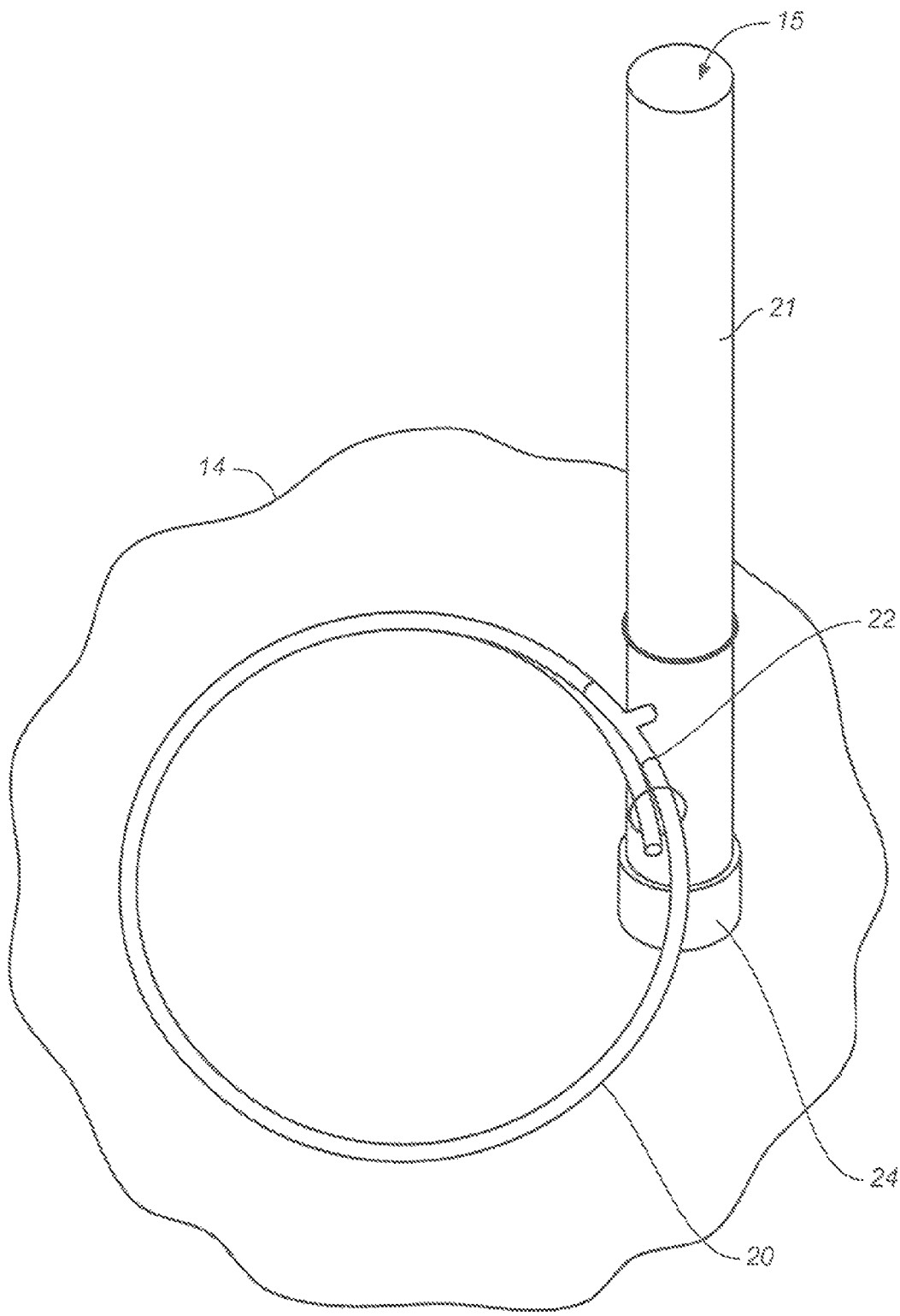
FIG. 2 is a perspective view of a modular internal water delivery assembly of the present invention showing an internal configuration of one embodiment of the watering system.

Referring now to the invention in more detail, in FIGS. 1 and 2 there is shown a vertical gardening container assembly composed of a rectangular section of sturdy mesh material that has been rolled info a cylindrical form so that the shorter ends abut and are secured together to form a cylindrical cage, 10, having circular upper and lower rims 5 and 6, respectively. The mesh material forming cage 10 must be sturdy enough to form a cylinder and stand on its own. It should not be collapsible or easily bendable. A preferred material is a wire mesh of 16 gage or more, for example wire mesh with large rectangular holes of the type used in fencing fields (commonly termed "turkey fencing" or "welded wire mesh"), although a rigid plastic, a wicker or a flexible wooden mesh would also work. Wire mesh commonly termed "chicken wire" would not be sturdy enough for this purpose. Cage 10 as shown, is intended to be 24 inches high and 18 inches in diameter, but the actual dimensions of the cage may vary as long as a diameter greater than 12 inches is maintained. Cylindrical cage 10 provides a form within which a water impermeable bag, 11, of substantially the same dimensions as the cage is positioned within cage 10 such that the closed end of the bag forms the bottom of the cage/bag assembly and the open end of the bag is supported by the upper rim of cage 10, with the outer surface of the cylindrical bag directly accessible through the mesh of the mesh cage. When filled with a plant growth substrate, this container offers the user a total area for growing plants equal to the surface area of the cylinder minus the surface area of the bottom of the up-ended cage—this last area defining a "footprint" for the device.

Bag 11 can be disposed within cage 10 such that the open end of bag 11 is positioned to fold over upper rim 5 of the cage, or bag 11 may be supported by the upper rim 5 of the cage by other means, for example by Velcro® or ties attached to the top of the bag. Bag 11 is composed of a material that is air and water permeable but able to contain solids such as soil. It can be composed of a loose weave material to permit movement of air and water through it. Exemplary materials for the bag include burlap and woven plastic fabrics. A bottom sub-assembly including a circularly-shaped tray, 12, having a diameter no greater than the diameter of the cage is positioned in the bottom of the bag to form a bottom reservoir. The tray may be made of relatively rigid plastic, or of her water impermeable material. The tray, 12, has a relatively flat portion and an upwardly-extending, circumferentially-disposed, wall, 17. In the wall is a hole receiving an overflow pipe, 18. This subassembly (tray and overflow pipe) is positioned inside the bottom of bag 11 at the lower rim 16 of cage 10 such that the bottom, 13, of the tray sits directly atop the inside bottom of the bag and forms a relatively rigid, impermeable, bottom to the assembly to prevent water and soil leakage from the bottom. Overflow pipe 18, which can be formed from rigid or flexible water-impermeable material, is positioned in and extends through wall 1 of tray 12. Overflow pipe 18 allows excess water to exit the assembly by force of gravity. It may be any length and positioned at any height in the tray wall as long as it is able to allow excess water to flow out of the assembly. An optional stop-cock or shut-off valve may be disposed in-line to permit regulation of the amount of water removed from the sub-assembly.

Bag 11 is filled with the desired substrate to a height of no more than one half the height of cage 10 (as shown, this is 12 inches) to form a lowermost substrate layer, 14. A watering sub-assembly, 15, (shown in detail in FIG. 2) is then positioned within the bag at that height (no more than one half the height of the cage) and atop the substrate layer 14. A water impermeable sheet, 16, (not shown in FIG. 2, see FIG. 1) is positioned atop the watering assembly. Watering sub-assembly 15 is composed of a loop of drip or soaker watering hose, 20, attached by means of a t-connector or other attachment means such as an elbow-connector, 22, to one end of an intake pipe, 21. Hose portion 20 is disposed horizontally and intake pipe 21 extends in perpendicular relation, to it, to a height up to or over the top rim 15 of mesh cage 10. Alternatively, as specifically shown in FIG. 2, the bottom, end of intake pipe 21 may be sealed with an end cap, 24, and attachment means 22 and hose 20 portion of the sub-assembly may be attached to a foramen (elbow-connector) in intake pipe 21 that is positioned above the end cap. In either arrangement, when a t-connector is used as the attachment means, each end of watering hose 20 is coupled to one of the two ends of the t-connector that form a straight tube and the remaining end of the t-connector is coupled to the open end of intake pipe 21 or is inserted into a foramen in intake pipe 21 positioned above the end cap. Water impermeable divider 16 is formed from a flexible, water-impermeable material such as a sheet of plastic or a plastic tray of the same diameter as said mesh cage 10. Intake pipe 21 extends vertically through a hole (not numbered but shown in FIG. 1) in divider 16. The hole is formed in divider 16 so that intake pipe 21 passes through snuggly with a relatively water tight fit, thus forming a water retaining barrier above the bottom layer 14, The arrangement permits water poured into intake pipe 21 to be delivered to the top of bottom layer 14 through the divider sheet, 16, and throughout the rest of the substrate via gravity.

As shown in FIG. 1, a second layer of substrate, 19, is added onto the top surface of divider 16 to a depth of not more than 12 inches. The arrangement described and shown permits substrate in the bottom layer of the container to be evenly watered by introducing water or nutrient solutions into the vertical pipe protruding from the top layer of substrate 19. The top layer of substrate 19 may be watered directly through the open top of the assembly. Thus configured, the container occupies a footprint of less than 4 square feet but provides a planting area of approximately 10 square feet, of which the majority is the vertically-oriented periphery of the cylinder.

Figure 3:
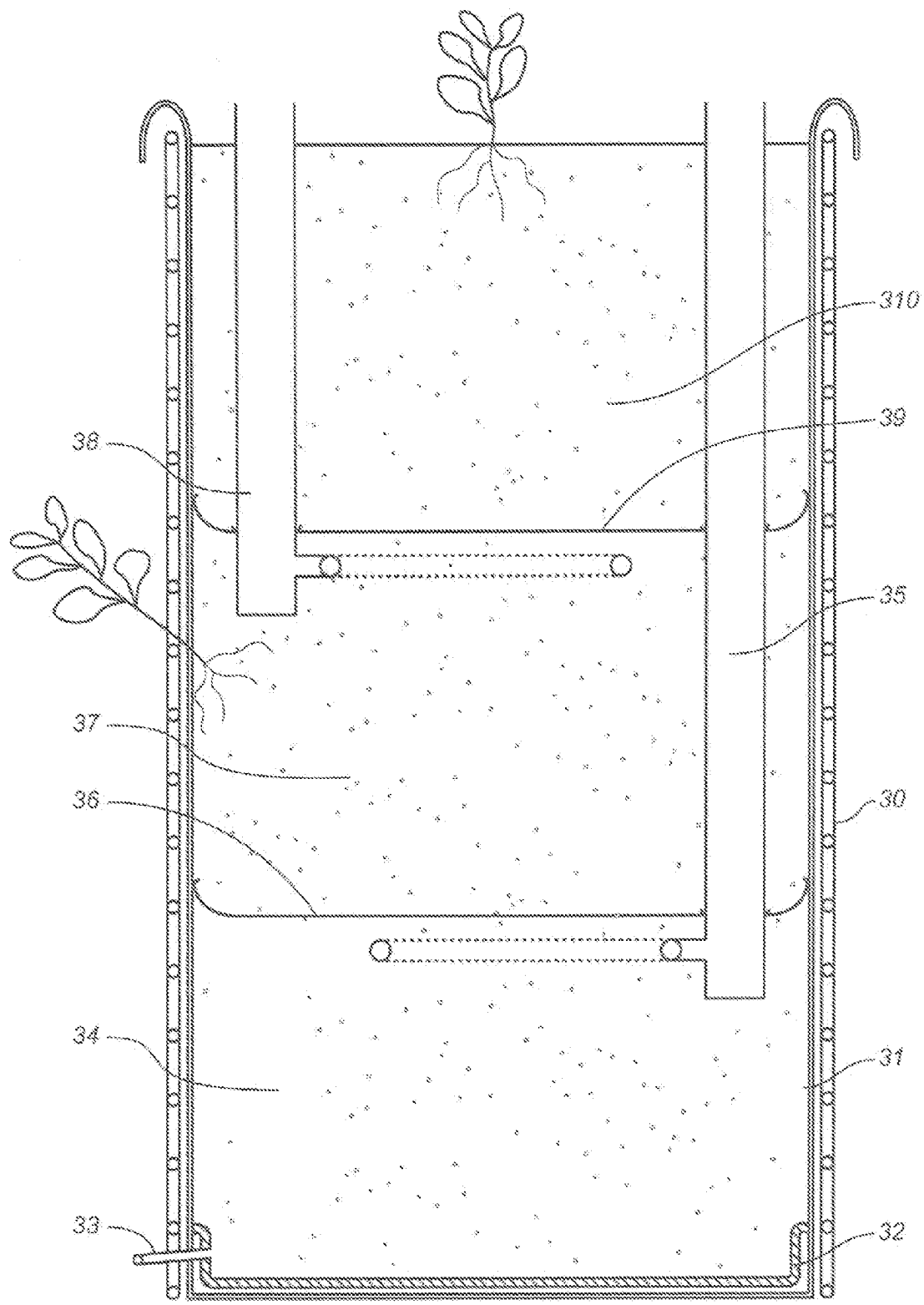
FIG. 3 is a cross sectional side view of a vertical gardening container of the present invention.

Larger planting areas can be achieved by using a mesh cage and bag of larger dimensions. For example, referring now to FIG. 3, there is shown a three-layered device comprised of a vertically-disposed, cylindrical mesh cage 30. In FIG. 3, cage 30 is 36 inches tall with a diameter of 18 inches. The inside of cage 30 is lined with a bag, 31, made of a loose weave material such as burlap or woven plastic to permit movement of air and water through its sides. A circular tray, 32, incorporating an overflow pipe, 33, as described above, is placed in the bottom of the bag so that the tray functions as a catch basin for excess water and eliminates it from the assembly via the overflow pipe. The bag is filled with the desired substrate to a height of no more than one-third the height of the cage (12 inches in the illustrated example) to form the bottom substrate layer 34. A first watering sub-assembly, 35, composed as already described of a horizontally arranged loop of drip or soaker hose, 20 attached to a vertically-extending intake pipe 21 is placed on the surface of bottom substrate layer 34. The vertically-extending intake pipe is of such height as to extend, from the top of the layer 34 up to or above the top rim of mesh cage 30 and bag 31. A water impermeable, flexible divider, 36, as previously described is disposed and arranged atop the soaker loop 20 atop the bottom substrate layer 34. A second layer of substrate, 37, is then added on top of divider 36 to a depth of at least one-half and not more than two third's the height of the cage (an additional 12 inches in the illustrated example) and a second watering sub-assembly, 38, composed as already described is disposed, and arranged atop the surface of the second layer of substrate 37, in the same manner and at the same minimum and maximum heights as the substrate. The vertically-extending intake pipe is of such height as to extend from the top of the second layer 37 up to or above the top rim of the mesh cage 30 and bag 31. A second waterproof divider, 39, is formed as previously described and positioned atop the second watering assembly as described, thus forming a water retaining barrier above second layer 37. A third layer of substrate 310 is then added on top of second, wafer impermeable divider 39 to fill the bag (about an additional 12 inches in the current, illustrated example). With this arrangement, water may be evenly distributed to the two Lower layers of substrate through the open ends of the intake pipes 31 and 38 that protrude from the top substrate layer, 310, while the top layer may be watered directly on its exposed surface. Thus configured, the container occupies a footprint of approximately 4 square feet but provides a planting area of approximately 15 square feet of which the majority is the vertically oriented periphery of the cylinder. A device of 48 inches in height, and having a plantable area of approximately 20 square feet can be similarly constructed by those skilled in the art, by iterating the steps outlined in the examples described above, with larger mesh cage and bag so as to accommodate a fourth layer of substrate.

Figure 4:
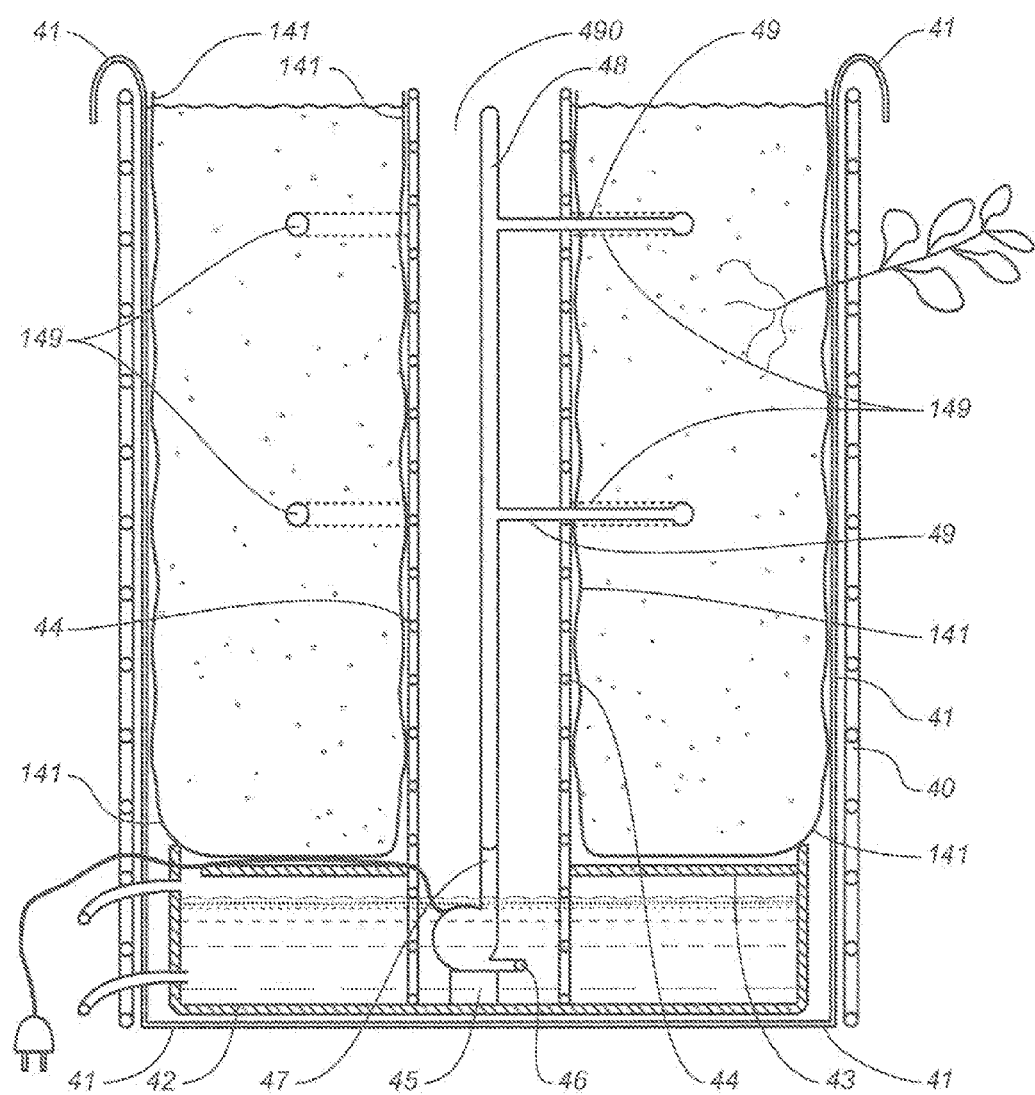
FIG. 4 is a cross sectional side view of a hydroponic vertical gardening container of the present invention.

FIG. 4 illustrates another embodiment of the invention, a variation in which of the assembly may be internally arranged so as to support the use of hydroponic methods of plant cultivation in a vertical format. In FIG. 4, an arrangement of two container assemblies is illustrated and from this description and with minor modifications that will be described below, one of skill in the art will readily understand how triangular, square and rectangular formations may be created. The assemblies can be composed of the same materials as previously described. In this embodiment, outer cylindrical cage 40 has a substantially larger diameter than inner cylindrical cage 44, which is disposed coaxially within outer cage 40. Inner cage 44 has a diameter only large enough to provide access to a submersible water pump, whereas outer cage 40 has a diameter large enough to fully encircle inner cylindrical cage 44 and have enough growing area for plants (about the same volume as in the previously described configurations). In this regard, the height/diameter ratio of 4:3 that is employed in a one assembly system can be modified to a 1:1 or 3:4 ratio for this particular embodiment. The outer and inner cylindrical cages, 40 and 44, are positioned coaxially so as to create an internal cavity, 49, that allows access for air and pipes throughout the height of the device and creates a space for the positioning of a submersible water pump, 45, which is positioned inside and at the bottom of cage 44. Submersible pump 45 has an inlet port 46 and an outlet port 47, the latter of which is attached to one end of a length of rigid pump pipe, 48, extending vertically from the pump to the top of the assembly. The other end of rigid pump pipe 48 is sealed. At intervals of not more than 12 inches, a plurality of short sections of tubing 49 are attached to pipe 48 by attachment means previously described and extend horizontally through the inner mesh cage 44 into the substrate containing cavity formed by the coaxial positioning of inner cage 44 and outer cage 40. Each of tubing 49 is connected to a loop of soaker hose, 149, in the same manner as already described in relation to the previous embodiments. The soaker hose, 149, is disposed and arranged so as to lie equidistant from the outer surface of the inner mesh tube 44 and the inner surface of the outer bag 41. A water reservoir, 42, is employed instead of a circular tray and overflow pipe. The water reservoir is formed and disposed so as to snuggly fit in place at the bottom of a bag, 41, which is substantially the size of outer cage 40 and is disposed inside it. Bag 41 is made of flexible, woven plastic or burlap. Bag 41 may be lined with paper or light gauge like material for greater water retention. Submersible pump 45 and inner cage 44 sit on the bottom surface of reservoir 42 within bag 41. Reservoir 42 has a reservoir cover, 43, and cover 43 has a plurality of perforations forming a perforated circle that has the same diameter as the diameter of the inner cage to allow inner cage 44 to extend through the cover and rest on the bottom of the reservoir. It may also have additional perforations for water flow as described below. A second, interior bag, 141, donut shaped, is disposed with its bottom atop the reservoir cover between the inner and outer cages. Plant growth substrate suitable for hydroponic growth such as lava rock, rock wool, coconut coir, plastic wool or other porous material fills bag 141 and the cavity between the inner and outer cages. This arrangement permits water from reservoir 42 to enter pump 45 and flow through hose 46 and into soaker hose rings 48, distributing water in a circular pattern into the body of the substrate. Water percolates downward, by gravity thereby wetting the porous substrate and drips back into the reservoir through the perforations in the cover plate.

In a variation on this embodiment, more than one vertical garden assembly is employed, but rather than one cage being smaller in diameter and positioned coaxially inside a larger cage, they may be arranged i planer, triangular, square or rectangular formation, depending on the number of assemblies and positioned to sit atop a reservoir containing a submersible pump. Less desirably, a plurality of reservoirs and pumps may be employed to equal the number of cages.

Figure 5:
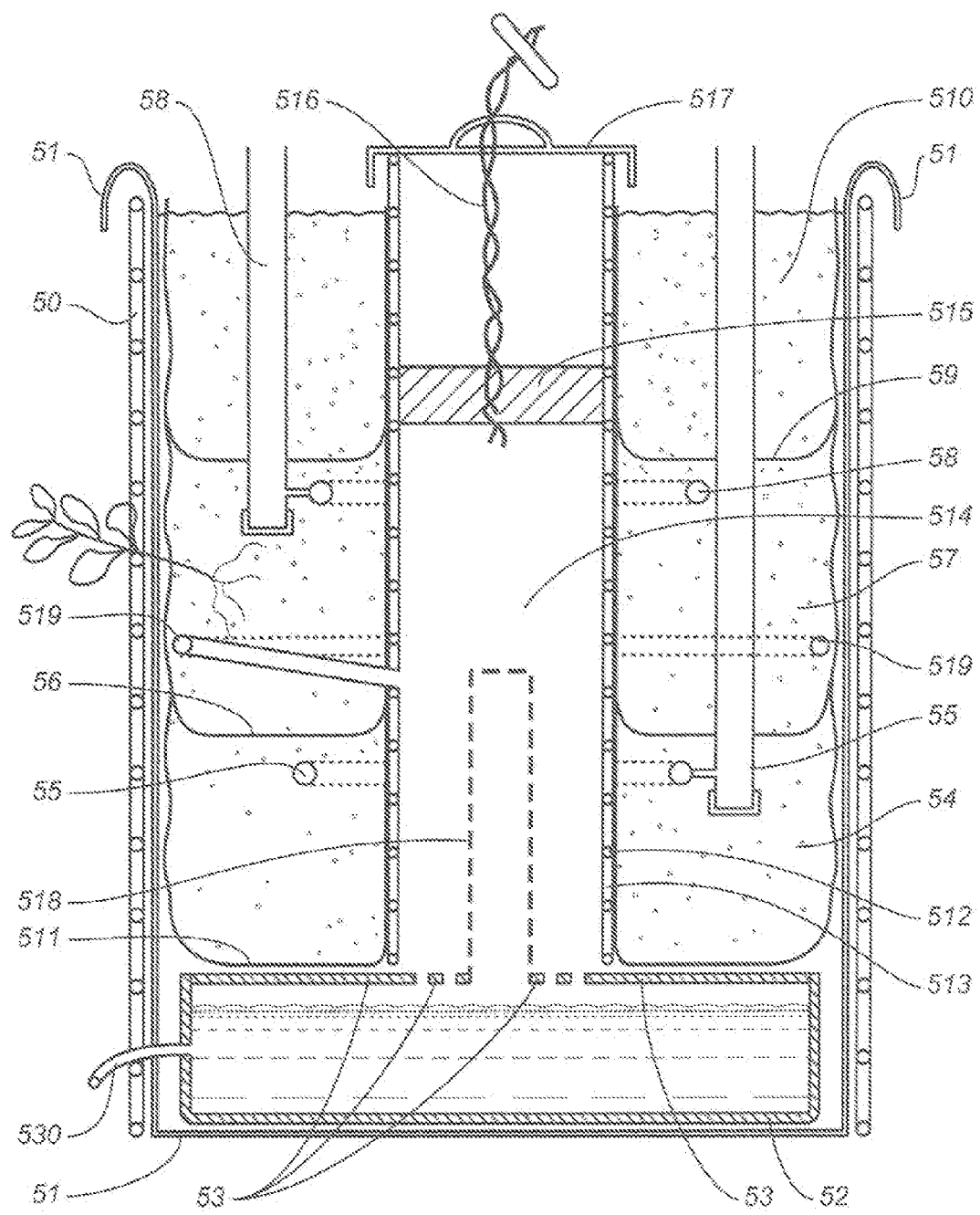
FIG. 5 is a cross sectional side view of a vertical gardening container incorporating an internal composting chamber.

In another embodiment shown in FIG. 5, a variation of the assembly shown in FIG. 4 so as to support the use of biological heating of plants cultivated in a vertical format is illustrated. The cylindrical form of the assembly is employed to bring the roots of the plants into proximity with a natural source of heat created by composting of organic materials in the central chamber or cavity created by the coaxially arranged inner cylinder. Frequently, in colder areas, gardeners face the threat of frost and freezing during the early weeks of the growing season, or the end of the growing season, as winter weather approaches. This embodiment is a variation that combines the stacking feature of the basic embodiment with the coaxially arranged outer and inner cylindrical cages of the second embodiment. It permits contestable materials or manure to be introduced into the central, coaxially-arranged inner cylinder. The exothermic microbial reactions of the composting process thereby provide direct heat to the substrate arranged around this inner cylinder, thereby maintaining it at a temperature at which plant growth can proceed. At the conclusion of the composting reactions, roots of plants growing in the substrate may grow into the body of the composted material, providing an additional source of nutrients for the plants growing on the vertical surface of the device. Carbon dioxide produced by the microbial reactions of the composting process may be ducted to the periphery of the cylinder so as to stimulate the growth of the plants growing there on.

In FIG. 5 there is shown a three-layered vertical garden assembly composed of vertically disposed mesh outer cage 50, formed as previously described, measuring 36 inches in height and having a diameter of at least 20 inches. As in the previous embodiment, the height/diameter ratio must be modified to account for the loss of substrate due to the inner cage. Outer cage 50 is lined inside with a bag, 51, made of a loose weave material such as burlap or woven plastic such as permits movement of air and water through its sides. A water impermeable reservoir, 52, having a diameter so as to snuggly fit inside the bag, is placed at the bottom of bag 51 to catch excess water. A reservoir cover, 53 is disposed on the top of the reservoir. Cover 53 has a plurality of perforations that permit water to drain downward by gravity force into the reservoir and air to draft upward from reservoir 52. A second, inner, mesh cage 512 is arranged inside of and coaxially in relation to outer cage 50 and bag 51 so as to create an internal compost chamber extending throughout the height of the vertical garden assembly. Centrally disposed inside this compost chamber is a vertically extending tubular member, 518, that has a length about one half the total height of the container assembly. Tubular member 518 can be either made of a somewhat rigid mesh material or it may be made of rigid, perforated pipe. As described in this embodiment, the total height of the assembly is 36 inches and the appropriate diameter for the tubular member is 3 inches. If the height of the assembly were larger or smaller, the diameter of tubular member 518 would either increase or decrease accordingly. Tubular member 518 is closed at its upper end and open to reservoir 52 through a perforation in cover 53 at its lower end.

A flexible sheet, 511, having a central hole the same dimension as the inner cage diameter, is positioned to surround inner cage 512 and rest atop reservoir cover 53. Sheet 511 may be made of any water impermeable material; sheet plastic is preferred. Bag 51 is filled around the outside of inner cage 512 with the desired substrate to a height of no more than one third the height of the container assembly to form a bottom layer of substrate, 54. A first watering sub-assembly, 55, made as described in relation to embodiment one, is positioned on the top surface of substrate bottom layer 54 and around inner cage 512. As in the first, basic embodiment, the vertically-extending intake pipe, 55, of the sub-assembly must be tall enough to extend from the top of substrate layer 54 up to or above the top rim of cages 50 and 512, and bag 51. Likewise, a water-impermeable divider, 56, such, as a sheet of plastic or a plastic tray of the same diameter as outer cage 50 is positioned atop the substrate. The divider is formed with a hole substantially the same diameter as the diameter of intake pipe of watering sub-assembly 55 to allow the intake pipe to pass through the hole snuggly with a relatively water tight fit, thus forming a water retaining barrier above the substrate bottom layer 54. The arrangement thus permits water poured into the assembly to be delivered to the bottom layer through the divider sheet.

A second layer of substrate, 57, is positioned on top of divider 56 to a depth of not more than two-thirds the height of the assembly and a second watering sub-assembly, 58, made as described in relation to the basic embodiment, is positioned atop second substrate layer 57. The intake pipe of this second watering sub-assembly has a length such that the open upper end extends to or above the rims of the inner and outer cages. A second water impermeable divider, 59, arranged on top of second watering sub-assembly forms the water-retaining barrier above the second substrate layer 57. This second divider is formed with two holes, each positioned to permit the vertically-extending intake pipes of the watering sub-assemblies 55 and 58 to pass through the divider. A quantity of substrate to form third substrate layer 510 is added on top of this second divider to substantially fill the container assembly. With this arrangement, water may be evenly distributed to the two lower layers of substrate through the open ends of the vertical pipes 51 and 58 that protrude above the third substrate layer, while that latter substrate layer may be watered directly on its exposed surface. Thus configured, the container occupies a footprint of approximately 6 square feet hut provides a planting area of approximately 15 square feet of which the majority is the vertically oriented periphery of the cylinder.

At intervals of not more than about 12 inches, one end of a flexible gas transfer tube 519 is positioned in compost chamber 514. Gas transfer tube 519 extends horizontally to protrude through inner cage 512 into outer cage 50 and bag 52 (across the cavity between inner and outer cages) and form a loop around the circumference of the outer cage to permit gases produced in compost chamber 514 to be evacuated in close proximity to the leaves and stems of plant growing in the side of the container. For this purpose gas transfer tube 519 is perforated. A plug, 515, connected to a compost chamber cover, 517, by an adjustable cord, 516, is used to cover the composting materials inside the compost chamber, 514. Plug 515, compost chamber cover 517 and adjustable cord 516 may be made of any suitable materials.

This vertical gardening assembly permits compostable materials placed in cavity to receive oxygen through the perforated reservoir cover plate 53 and gas transfer tube 519 so as to maintain, aerobic fermentations, the heat of which can provide heating for substrates in surrounding layers 54, 57, and 510. Liquid draining from the composting material is captured in reservoir 52 from which it can be drained periodically through overflow pipe 530 to provide a compost tea for fertilizing the plants or re-soaking the compost material in compost chamber 514. Carbon dioxide and other gases are evacuated from the cavity by gas transfer tube 519, from which gas is released under the leaves of plants growing on the periphery of the device so as to promote their growth.

Figure 6:
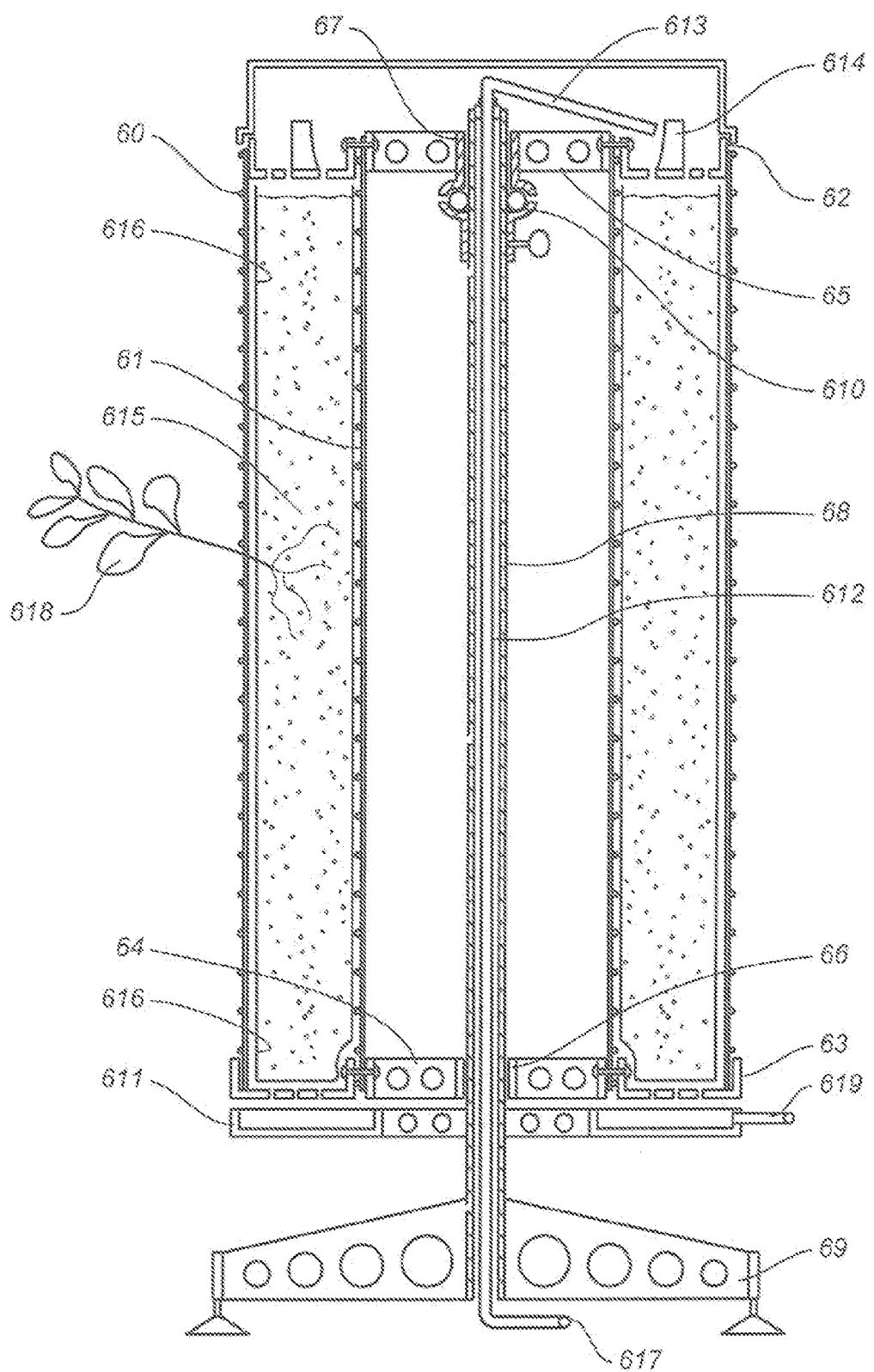
FIG. 6 is a cross sectional side view of a vertical gardening container and stand incorporating an internal configuration for hydroponic growth of plants and hydrostatic turning of the container.

In yet another embodiment, shown in FIG. 6, a variation of the assembly illustrated in FIG. 4 is shown that can support assemblies of greater diameter. Such larger units may be used where reduced weight of the device is desirable such as on rooftops or in commercial settings where manual or automated turning of the whole device to expose all plants to equal sunlight is needed. This embodiment is a variation that may combine the stacking features of the basic embodiment, with the coaxial arrangement of outer and inner cylindrical cages of the second embodiment so as to leave a vacant cylindrical space at the center of the device resulting in a lower weight and reduced need for substrate. The tubular form of the device permits a plurality of support structures and watering connections to be devised that make use of the central inner space. In the embodiment shown in FIG. 6, a version of the device suitable for growing plants hydroponically is illustrated. The vertical garden assembly is composed of a vertically arranged mesh outer cage, 60 formed as previously described in relation to embodiment one, and measuring 72 inches in height and having a diameter of 36 inches. Interior to this a coaxially arranged inner mesh cage 61 of such diameter that the distance between the outer cage and the inner cage is 8 inches (at least 6 inches depth of substrate is considered by those skilled in agriculture to be a minimum for healthy root growth of many common edible plants in normal planting). Inner and outer cages are connected by doughnut-shaped end trays 62, 63, which may be made of rigid plastic or metal or other water impermeable material. The trays have a relatively flat portion and an upwardly-extending, circumferentially-disposed wall and an upwardly-extending circumferentially-disposed inner wall of the interior perforation of the donut-shaped form. The inner walls of the doughnut-shaped end trays 62, 63 are of a diameter to snuggly fit around the inner mesh cage 61 and are attached to a concentrically disposed wheel-like assembly comprising a rim to which are attached radially arranged spokes 64, 65. The spokes are attached at their inner ends to a cylindrical hub 66, 67 of diameter such as to snuggly fit around the tubular member 68 of a support-stand 69. The rim is of equal or greater height to the interior wait of the end-tray 62,63, and of diameter so as to snuggly fit inside of the inner mesh cage 61. The rim is attached to the inner wall of the end trays 62 and 63 by bolts or clamps that pass through the spaces of the inner mesh cage 61 such that when tightened, they clamp the inner mesh cage 61 rigidly between the end tray 62 and 63 and the wheel-like sub-assembly. The spokes of the wheel-like sub-assembly are attached at their inner ends to the outside of a coaxially arranged short cylindrical hub 66, 67 of diameter such as to snuggly fit around the tubular member 68 of a support-stand 69 arranged so as to function as a vertically oriented axle about which the rigid structure formed by the mesh cages 60 and 61 attached to their end trays 62, 63 can freely rotate. At the upper end of the support stand, a plate and ball-bearing assembly 610 is attached to the axle and hub 67 of the upper wheel-like assembly to facilitate the friction free rotation of the whole cage and end trays assembly about a vertical axis. A third donut shaped tray, 611, of diameter 36 inches is attached by spokes to the support stand tubular axle 68 immediately beneath the lower end of the mesh and end tray assembly. A water pipe, 612, threaded through the inside of the tubular axle 68 of the support stand, 69, entering through its lower end and exiting at the top end where it is attached to a rigid exit tube and nozzle arranged so as to direct a stream of water exiting water pipe 612 into the upper donut shaped tray 62. Affixed to the flat portion of the horizontal upper tray is a radially disposed array of upwardly-extending turbines, set at such an angle that the jet of water exiting the pipe and nozzle 613 can cause the upper tray and attached mesh assemblies 60,61 to rotate around the tubular axle 68 supported by the ball hearing assembly 610. The flat portion of trays 62, 63, are perforated so as to permit water to pass through and drip evenly over the surface of growing substrate 615 contained within a donut shaped bag 616 made of a semi-porous material such as burlap or woven plastic as described for previous embodiments. The bag is formed and positioned to fit snuggly inside the volume between the inner 61 and outer 62 mesh cages. Alternatively, multiple bags of tubular shape and appropriate dimensions can be packed inside the same volume. The bags are perforated at their bottom end and sit inside the lower end-tray 63, which is also perforated.

This vertical gardening assembly permits nutrient solutions, nitrogen-rich aquaponic effluents, pond water, or gray water to be pumped into inlet 617 of water pipe 612 and to exit through the rigid pipe and nozzle, 613, directly onto the blades of the turbine array, 614, causing the mesh cage and end-tray assembly to rotate about the tubular axle 68 supported by the plate ball-bearing assembly 610. The speed of rotation depends on the force of the water pump and the overall weight of the mesh cage and end-may assembly, and any plants growing on its outer surface, 618. Water entering the upper end tray, 62, can percolate through perforations in the tray onto the surface of the substrate, 615, in bag 616 and percolate to the bottom of the bag by force of gravity thereby providing moisture to the substrate and plants growing therein. At the bottom, the water drips through perforations in the bottom end-tray into a static end tray, 611, where it collects and can exit through drain pipe 619. The overall result is a modular device that may be used to grow plants by perfusing the roots with nutrient containing aqueous solutions able to support plant growth. The assembly uses the hydrostatic pressure of the solution to rotate the device so that plants growing on the external surfaces may be evenly exposed to sun or artificial lighting by changing the orientation of the device. The assembly can also be used to filter contaminated water using the toxin absorbing and metabolizing action of certain plant species, which may be grown on it for that purpose. Similarly, in multistory buildings such as hotels and office buildings which have sealed windows, it may provide a dual function, by purifying gray water from sinks and washing machines, and by counter-acting indoor air pollution by absorbing noxious airborne chemicals such as formaldehyde, carbon dioxide, dioxins, and the like, depending on the species planted.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A vertical gardening container assembly comprising:
   (a) a cylindrical mesh cage having circular upper and lower rims and open ends forming an open top and bottom when placed in an upright position;
   (b) an air and water permeable bag positioned within the cage with closed end of the bag forming a bottom for the cage and an open end of the bag being supported by the upper rim of the cage, the bag being capable of retaining a plant growth substrate placed within it;
   (c) a bottom sub-assembly including a circularly-shaped tray having a diameter no greater than the diameter of the cage and a circumferentially-disposed wall having an overflow pipe extending therethrough, the tray and overflow pipe being impermeable to soil and water and positioned at the bottom of the bag so as to be superposed thereon with the wall of the tray extending upwards; and
   (d) a first watering sub-assembly positioned within the bag at a height no more than one-half the height of the cage, the watering sub-assembly comprising a loop of soaker hose positioned in the horizontal plane around the interior of the bad and a hollow, vertically extending, intake pipe connected near or at one end by connector means to the loop of soaker hose, the pipe having a height up to or above the top rim of the cage.

2. The vertical gardening container assembly in accordance with claim 1 wherein the first watering sub-assembly is positioned within the bag at a height no great than one-third the height of the cage and wherein the assembly further comprises:
   (a) a divider sheet formed of flexible, water-impermeable material having a hole such that the intake pipe extends vertically through the hole snuggly to form a water retaining barrier atop the first watering sub-assembly; and
   (b) a second watering sub-assembly positioned within the bag at a minimum height at least one half the height of the cage and at a maximum height no more than two-thirds the height of the cage and being.

3. The vertical gardening container assembly in accordance with claim 2 wherein the divider sheet is composed of plastic.

4. The vertical gardening container assembly in accordance with claim 1 wherein the cylindrical mesh cage is composed of metal.

5. The vertical gardening container assembly in accordance with claim 1 wherein the bag is composed of burlap.

6. The vertical gardening container assembly in accordance with claim 1 wherein the bottom sub-assembly is composed of plastic.

7. A vertical gardening container assembly comprising:
   (a) an outer cylindrical mesh cage having circular upper and lower rims and open ends forming an open top and bottom when placed in an upright position;
   (b) an air and water permeable bag positioned within the cage and with closed end of the bag forming a bottom for the cage and an open end of the bag being supported by the upper rim of the cage, the bag being capable of retaining soil placed within it;
   (c) an inner cylindrical mesh cage disposed coaxially within the bag and having a substantially smaller diameter than the outer cage, the outer and inner cages forming a donut-shaped cavity large enough to accept enough plant growth substrate for plant growing;
   (d) a water reservoir of substantially the same diameter as the outer cage positioned in the bottom of the bag with the bottom of the reservoir superposed on the bottom of the bag; and
   (e) a water pump formed and positioned in the reservoir to pump water from the reservoir into the donut-shaped cavity formed by the inner and outer cages.

8. The vertical gardening assembly according to claim 7 wherein a rigid, hollow, water-impermeable pipe having a plurality of spaced-apart t-connectors is connected at one end to the outlet port of the submersible pump and is capped at the other end with sealing means, the pump being positioned within and at or near the bottom of the internal cavity formed by the inner cage and the pipe extending vertically upward from the pump.

9. The vertical gardening assembly according to claim 8 further comprising a plurality of tubes, each tube being attached at one end to the pipe at a t-connector and extending horizontally through the inner cage into the donut-shaped space formed by the coaxial positioning of the inner and outer cages.

10. The vertical gardening assembly according to claim 9 further comprising a plurality of looped soaker hoses, each soaker hose being connected a tube at the other end and disposed and arranged so as to lie equidistant from the outer surface of the inner cage and the inner surface of the outer bag.

11. The vertical gardening container assembly in accordance with claim 10 wherein the pipe, t-connectors, tubes and hoses are composed of suitable plastics.

12. The vertical gardening assembly according to claim 7 further comprising a cover formed and positioned to cover the water reservoir and having plurality of perforations forming a circle having the same diameter as the diameter of the inner cage to allow the inner cage to extend through the cover and rest on the bottom of the reservoir.

13. The vertical gardening container assembly in accordance with claim 7 wherein the cylindrical mesh inner and outer cages are composed of metal.

14. The vertical gardening container assembly in accordance with claim 7 wherein the bag is composed of burlap.

15. The vertical gardening container assembly in accordance with claim 7 wherein the water reservoir is composed of a suitable plastic.

16. A vertical gardening container assembly comprising:
   (a) an outer cylindrical mesh cage having circular upper and lower rims and open ends forming an open top and bottom when placed in an upright position;
   (b) an air and water permeable bag positioned within the cage and with closed end of the bag forming a bottom for the cage and an open end of the bag being supported by the upper rim of the cage, the bag being capable of retaining a plant growth substrate placed within it;
   (c) an inner cylindrical mesh cage disposed coaxially within the bag and having a substantially smaller diameter than the outer cage, the outer and inner cages forming a donut-shaped cavity large enough to accept enough plant growth substrate for plant growing and the inner cylindrical mesh cage creating an internal compost chamber extending throughout the height of the vertical garden assembly;
   (d) a water reservoir of substantially the same diameter as the outer cage positioned at the bottom of the bag with the bottom of the reservoir superposed on the bottom of the bag;
   (e) a first watering sub-assembly positioned within the bag at a height no more than one-half the height of the cage, the watering sub-assembly comprising a loop of soaker hose positioned in the horizontal plane around the interior of the had and a hollow, vertically extending, intake pipe connected near or at one end by connector means to the loop of soaker hose, the pipe having a height up to or above the top rim of the cage;
   (f) a reservoir cover disposed on the top of the reservoir and having a plurality of perforations that permit water to drain downward by gravity force into the reservoir and air to draft upward from reservoir;
   (g) a vertically-extending tubular member having a closed upper end and a lower end open to the reservoir through the reservoir cover, the tubular member being centrally disposed inside the compost chamber and having a length about one half the total height of the container assembly; and
   (h) compost chamber sealing means formed and positioned over the upper rim of the inner edge to minimize air entry into the chamber.

17. The vertical gardening container assembly in accordance with claim 16 wherein the compost chamber sealing means comprises a plug positioned within the compost chamber atop the compost material, a compost chamber cover positioned atop the compost chamber, and an adjustable cord, and wherein the plug is connected to a compost chamber cover by the adjustable cord.

* * * * *